No. 728,620. PATENTED MAY 19, 1903.
J. ROURKE.
PADDLE WHEEL.
APPLICATION FILED OCT. 7, 1902.
NO MODEL.
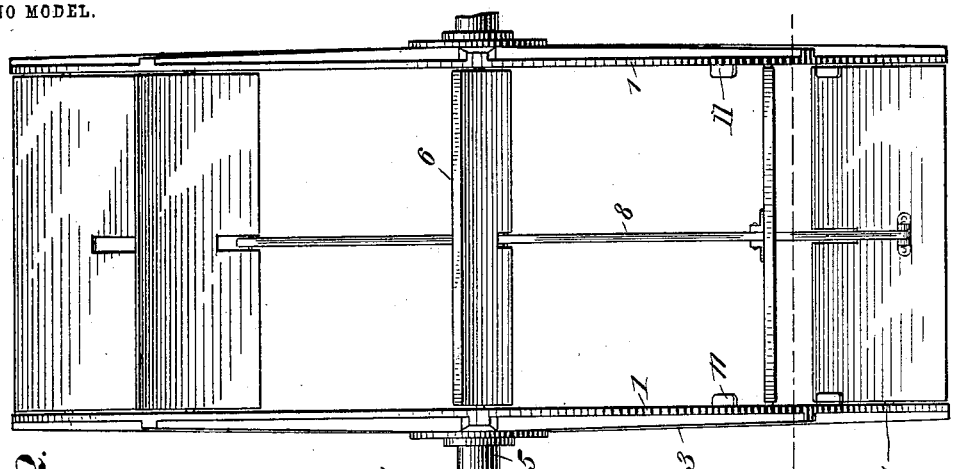
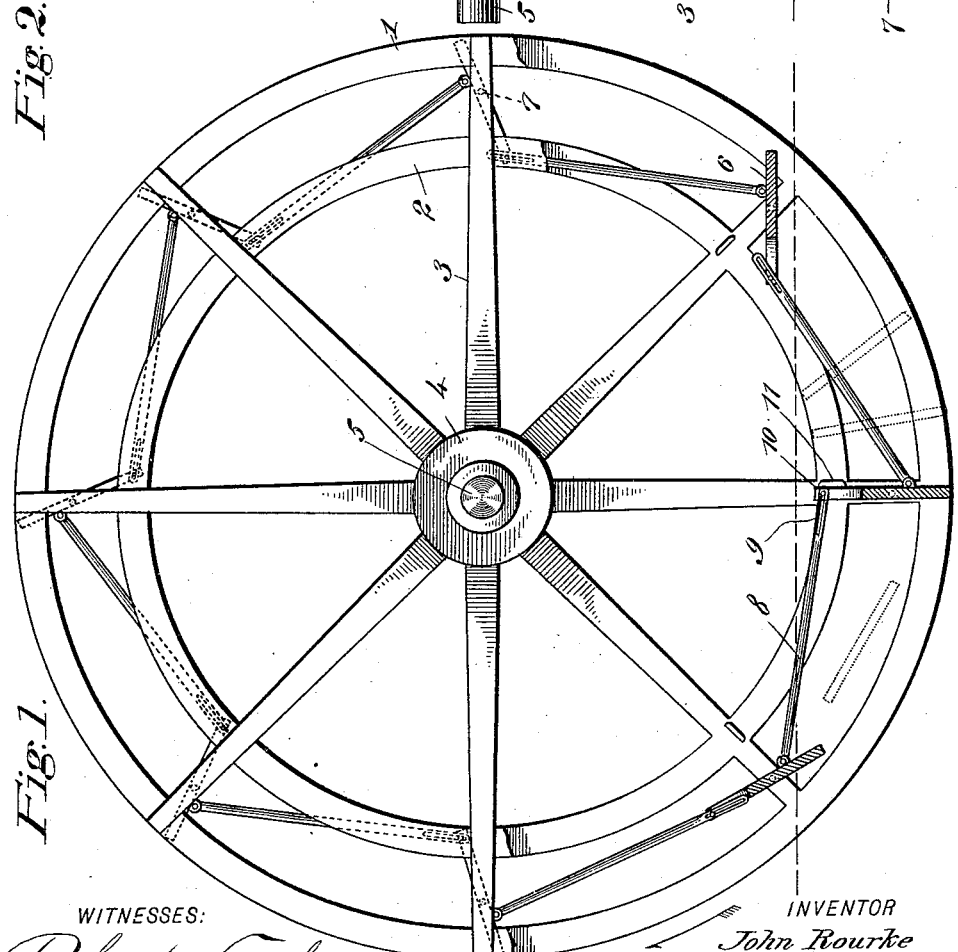
WITNESSES:
Robert Head
C. R. Ferguson
INVENTOR
John Rourke
BY Munn & Co.
ATTORNEYS.

No. 728,620. Patented May 19, 1903.

UNITED STATES PATENT OFFICE.

JOHN ROURKE, OF NEW LONDON, CONNECTICUT.

PADDLE-WHEEL.

SPECIFICATION forming part of Letters Patent No. 728,620, dated May 19, 1903.

Application filed October 7, 1902. Serial No. 126,337. (No model.)

*To all whom it may concern:*

Be it known that I, JOHN ROURKE, a citizen of the United States, and a resident of New London, in the county of New London and State of Connecticut, have invented new and useful Improvements in Paddle-Wheels, of which the following is a full, clear, and exact description.

This invention relates to improvements in paddle-wheels for vessels; and the object is to provide a paddle-wheel of the feathering-blade type so constructed that the friction on the blades upon entering and leaving the water will be reduced to a minimum.

I will describe a paddle-wheel embodying my invention and then point out the novel features in the appended claims.

Reference is to be had to the accompanying drawings, forming a part of this specification, in which similar characters of reference indicate corresponding parts in both figures.

Figure 1 is a side elevation, partly in section, of a paddle-wheel embodying my invention; and Fig. 2 is a front elevation thereof.

The end frames of the paddle-wheel consist of the outer rings 1 and the inner rings 2, connected by means of spokes 3, with the hubs 4, having the journals 5. The blades or paddles 6 have pivotal connections 7 at their ends with the spokes 3 between the rings 1 and 2, the pivotal connections 7 being placed below the longitudinal centers of the blades, (see Fig. 2,) thus providing a greater area for water-pressure above the pivotal connections than below the same. The blades are connected one with another by means of links 8, the said links being pivotally connected with a blade below its pivotal point and having sliding connection with the next forward blade above its pivotal point. As here shown, each link is slotted at its forward end, as indicated at 9, and this slotted end passes into an opening provided in the blade and receives a pin 10. By this arrangement when the blade first enters the water it is on a substantially horizontal plane, and the working blade, or, in other words, the lowermost blade, stands in a vertical position and thereafter quickly assumes a slanting position to cut edgewise through the water. The next blade while approaching its working or power position gradually assumes a vertical position, as indicated in dotted lines in Fig. 1. As the blade assumes its vertical position by the water-pressure against its upper portion the said blade engages at its ends with stop-lugs 11, arranged on the spokes of the end frames.

Having thus described my invention, I claim as new and desire to secure by Letters Patent—

1. In a paddle-wheel, a series of blades pivoted below their longitudinal centers, and link connections between the blades, each link having a pivotal connection with the blade below its pivotal point and sliding connection with the adjacent forward blade above its pivotal point.

2. A paddle-wheel comprising circular end frames, spokes extended from the circular frames to a hub, blades pivoted to said spokes, the pivotal connections being below the longitudinal centers of the blades, the upper edges of the blades being slotted or provided with openings, and links having pivotal connections with the blades below their pivotal points, the forward end of said links being slotted and passing through the openings of the forward blades, and pins in the blades passing through said slots.

In testimony whereof I have signed my name to this specification in the presence of two subscribing witnesses.

JOHN ROURKE.

Witnesses:
JNO. M. RITTER,
C. R. FERGUSON.